(12) United States Patent
Lim et al.

(10) Patent No.: US 9,595,211 B2
(45) Date of Patent: Mar. 14, 2017

(54) ELECTROMAGNETIC SHIELDING LABEL

(71) Applicant: 3M INNOVATIVE PROPERTIES COMPANY, St. Paul, MN (US)

(72) Inventors: Jeffrey A. Lim, Austin, TX (US); Bryan E. Buchan, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/414,811

(22) PCT Filed: Mar. 14, 2013

(86) PCT No.: PCT/US2013/031204
§ 371 (c)(1),
(2) Date: Jan. 14, 2015

(87) PCT Pub. No.: WO2014/014508
PCT Pub. Date: Jan. 23, 2014

(65) Prior Publication Data
US 2015/0161919 A1 Jun. 11, 2015

Related U.S. Application Data

(60) Provisional application No. 61/673,341, filed on Jul. 19, 2012.

(51) Int. Cl.
*B32B 3/02* (2006.01)
*G09F 3/10* (2006.01)
(Continued)

(52) U.S. Cl.
CPC ............... *G09F 3/10* (2013.01); *B32B 7/12* (2013.01); *B32B 15/043* (2013.01); *B32B 15/08* (2013.01);
(Continued)

(58) Field of Classification Search
CPC ......... B32B 7/12; B32B 15/043; B32B 15/08; B32B 15/12; B32B 2255/10;
(Continued)

(56) References Cited

U.S. PATENT DOCUMENTS 8,196,966 B2   6/2012   Allen et al.
8,427,317 B2   4/2013   Hammad et al.
(Continued)

FOREIGN PATENT DOCUMENTS

JP   2007-265339      10/2007
WO   WO 86/02531      5/1986
WO   WO 2008/144336   11/2008

OTHER PUBLICATIONS

Singapore Search Report for Application No. 11201500362X, dated Nov. 3, 2015, 1 pg.
(Continued)

*Primary Examiner* — Elizabeth Mulvaney
(74) *Attorney, Agent, or Firm* — Gregg H. Rosenblatt

(57) ABSTRACT

Provided is a shielding label comprising: a shield layer; a cover layer disposed on a first side of the shield layer, and a removable adhesive layer disposed on at least a portion of a second side of the shield layer, wherein the shield layer provides electro-magnetic shielding characteristics so as to prevent the exchange of data between an RFID article adjacent the shielding label and an external device when the component is located in the read range of the external device.

17 Claims, 4 Drawing Sheets

(51) Int. Cl.
*B32B 7/12* (2006.01)
*B32B 15/04* (2006.01)
*B32B 15/08* (2006.01)
*B32B 15/12* (2006.01)
*G09F 3/00* (2006.01)
*G09F 3/02* (2006.01)

(52) U.S. Cl.
CPC ............ *B32B 15/12* (2013.01); *G09F 3/0288* (2013.01); *B32B 2255/10* (2013.01); *B32B 2255/12* (2013.01); *B32B 2405/00* (2013.01); *B32B 2519/02* (2013.01); *G09F 2003/023* (2013.01); *G09F 2003/0208* (2013.01); *G09F 2003/0241* (2013.01); *G09F 2003/0248* (2013.01); *G09F 2003/0255* (2013.01); *G09F 2003/0257* (2013.01); *Y10T 428/12549* (2015.01); *Y10T 428/24802* (2015.01); *Y10T 428/2848* (2015.01)

(58) Field of Classification Search
CPC ............ B32B 2255/12; B32B 2405/00; B32B 2519/02; G09F 2003/0208; G09F 2003/023; G09F 2003/0241; G09F 2003/0248; Y10T 428/24802; Y10T 428/2848
See application file for complete search history.

(56) References Cited

U.S. PATENT DOCUMENTS

| | | |
|---|---|---|
| 2001/0050175 A1 | 12/2001 | Pulver |
| 2008/0186186 A1* | 8/2008 | Campbell ........ G06K 19/07327 340/572.8 |
| 2008/0297310 A1* | 12/2008 | Onderko .......... G06K 19/07327 340/10.1 |
| 2010/0044442 A1 | 2/2010 | Phillips |
| 2010/0224402 A1 | 9/2010 | Lim |
| 2010/0300744 A1 | 12/2010 | Romanko |
| 2012/0236528 A1 | 9/2012 | Le et al. |

OTHER PUBLICATIONS

Notice of Allowance for Russian Application No. 2015102518, dated Apr. 18, 2016 (8pgs).
Singapore Written Opinion for Application No. 11201500362X, dated Jun. 28, 2016, 4pgs.
Taiwan Search Report for Application No. 102111046, dated Jul. 11, 2016.

* cited by examiner

ELECTROMAGNETIC SHIELDING LABEL

TECHNICAL FIELD

The present invention relates to radio frequency identification and, more particularly, to articles for protecting information in radio frequency identification systems.

BACKGROUND

Radio frequency identification devices (RFID) carry data or information that can be accessed by a corresponding receiver. RFID creates an automatic way to collect information about a product, place, time or transaction quickly, easily. It provides a contactless data link, without need for line of sight. In addition, RFID is more than just an ID code; it can be used as a data carrier, with information being written to and updated as necessary or appropriate. The data or information carried and stored within RFID may be susceptible to dissemination and capture by persons not otherwise authorized to receive the data or information. Such unauthorized capture or receipt of RFID data or information presents a problem for those wishing to carry and store data or information safely within RFID.

SUMMARY

At least one embodiment of the present invention provides a shielding label comprising: a shield layer; a cover layer disposed on a first side of the shield layer, and a removable adhesive layer disposed on at least a portion of a second side of the shield layer, wherein the shield layer provides electromagnetic shielding characteristics so as to prevent the exchange of data between an RFID article adjacent the shielding label and an external device when the RFID article is located in the read range of the external device.

At least another embodiment of the present invention provides a shielding label comprising: a shield layer; a cover layer disposed on a first side of the shield layer, and a removable adhesive disposed on at least a portion of a second side of the shield layer, wherein the shielding label is shaped to substantially cover an antenna in an RFID article, and wherein the shield layer provides electromagnetic shielding characteristics so as to prevent the exchange of data between the RFID article adjacent the shielding label and an external device when the RFID article and the shielding label are located in the read range of the external device.

The above summary of the present invention is not intended to describe each disclosed embodiment or every implementation of the present invention. The Figures and detailed description that follow below more particularly exemplify illustrative embodiments.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the invention is defined by the appended claims.

In at least one embodiment, the present invention includes a shielding label that is useful for shielding radio frequency identification devices by interfering with or cutting off the electrical or magnetic radio frequency detecting signal emitted from electromagnetic equipment, electronics equipment, receiving devices, or other external devices. The shielding labels of the present invention prevent the exchange of data between an RFID article adjacent the shielding label and an external device. The shielding label does not need to be located between the RFID article and the external device to be effective. The shielding article is effective even if the RFID article is between the shielding article and the external device. Furthermore, although many embodiments of the present invention contemplate that the shielding article will be adhered to the RFID article, this is also not required for the shielding article to work. For, example, merely laying the shielding article on an RFID article, which is laying on an external device such as a card reader, will prevent the card reader from exchanging data with the RFID article.

Figure 1:
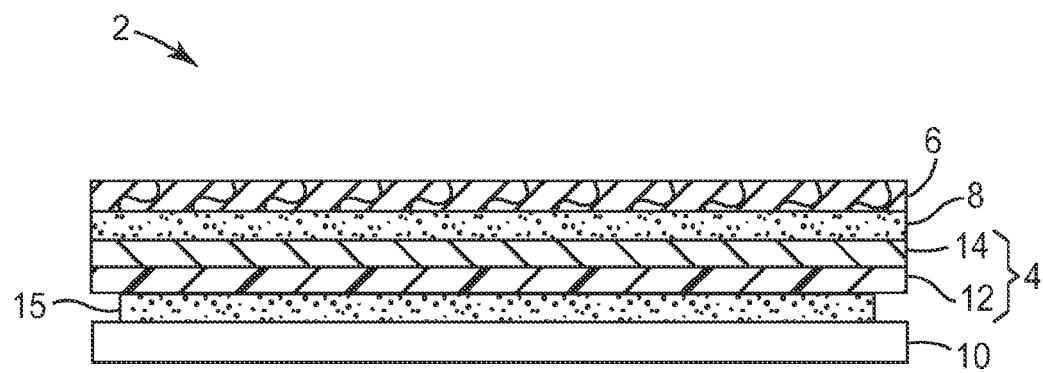
FIG. 1 is a schematic cross-sectional view of at least one embodiment of a shielding label of the present invention attached to an RFID article.

FIG. 1 illustrates an exemplary embodiment of a shielding label according to an embodiment of the present invention. Shielding label 2 includes a shield layer 4, a cover layer 6, and an optional adhesive layer 8 positioned between shield layer 4 and cover layer 6. Shield layer 4 provides electromagnetic shielding characteristics so as to prevent the exchange of data between an RFID article 10 and an external device (not shown) when the shield and cover layers are located adjacent to the RFID article within the read range of the external device. In the embodiment shown in FIG. 1, shielding label 2 is positioned relative to RFID article 10 such that shield layer 4 faces RFID article 10. In other embodiments, shielding label 2 may be positioned relative to RFID article 10 such that cover layer 6 faces RFID article 10. Shielding label 2 is removably attached to RFID article 10 by removable adhesive layer 15, which is typically applied to shield layer 4.

In the embodiment shown in FIG. 1, shield layer 4 includes a support layer 12 and a conductive layer 14 disposed on support layer 12. Conductive layer 14 may comprise a single metal layer or multiple metal layers. Examples of suitable single metal layers include, but are not limited to, copper, aluminum, and alloys thereof. Examples of multiple layers include, but are not limited to, Ni/Cu/Ni (as described further with respect to FIG. 2), Ni/Cu alloy/Ni. Conductive layer 14 may be disposed on support layer 12 by any suitable method. For example, conductive layer 14 may comprise a metal foil that is laminated onto support layer 12. In some embodiments, such a metal foil may comprise copper or aluminum. The desired thickness of such a foil will depend upon its composition and the intended use of the shielding layer. In general, a suitable thickness for a metal foil is about 5 μm to about 10 μm. In at least one embodiment, a suitable thickness is about 7 μm. Alternatively, conductive layer 14 may be formed by metalizing support layer 12, such as, e.g., by chemical deposition (such as, e.g., electroplating), physical deposition (such as, e.g., sputtering), or any other suitable method. In some embodiments, such a deposited metal layer may comprise copper or aluminum. The desired thickness of such a deposited metal will depend upon its composition and the intended use of the shielding layer. In general, a suitable thickness for a deposited metal layer is about 0.1 μm to about 0.5 μm. In at least one embodiment, a suitable thickness is about 0.2 μm. Support layer 12 may include any suitable support material, including but not limited to cellulosic paper and polymeric materials such as polyester, polypropylene, polycarbonate, and polyethylene. Support layer 12 provides sufficient flexibility for the final use of shielding label 2, while it also has sufficient rigidity for use in a metal deposition process. In at least some embodiments, support layer 12 is about 20 μm to about 60 μm thick. In at least one embodiment in which a metal foil layer is laminated to support layer 12, support layer 12 is about 25 μm thick. In at least one embodiment in which a metal is vapor deposited on support layer 12, support layer 12 is about 51 μm thick. Conductive layer 14 provides suitable electrical resistivity to allow the construction to act as a shielding label for RFID article 10. The resistivity of at least some embodiments of the present are from about 0.002 Ω/sq to about 0.01 Ω/sq. In at least one embodiment, the resistivity is about 0.004 Ω/sq.

Removable adhesive layer 15 may comprise any suitable adhesive that will allow shielding label 2 to be peeled away from RFID article 10 when desired. RFID article 10 may be any type of article such as a credit card, an identification card, an insurance card, a timecard, a payment card, an entry card, a metro card, a passport card, and the like. Such cards may be made from any suitable material and are typically plastic. Exemplary materials used to make such cards include polyvinyl chloride acetate (PVCA) and polycarbonate. Suitable adhesives may be high tack or low tack. In at least one embodiment, removable adhesive layer 15 is a combination of high and low tack adhesive sub-layers. In at least one such embodiment, a high tack adhesive sub-layer is adjacent support layer 12 and a low tack adhesive sub-layer is adjacent RFID article 10. In this manner, the removable adhesive layer 15 should separate from RFID article 10 and remain adhered to support layer 12. In at least one embodiment of the present invention a double-sided adhesive tape having high tack adhesive on one side and low tack adhesive on the other side may be used as removable adhesive layer 15. A suitable double-sided tape is 3M Removable Repositionable Tape 9415PC (having acrylic adhesives), available from 3M Company. Other examples of suitable double sided tapes available from 3M Company include tapes having the following trade designation: 665, 666, 9416, 9425, 9425HT, and 9449S. Suitable adhesives for removable adhesive layer 15 may be pressure sensitive, heat activated, hot melt, etc., and may be thermoplastic or thermoset, so long as they will release from the surface of RFID article 10 when desired. Removable adhesive layer 15 may cover all or part of a major surface of shielding label 2. Removable adhesive layer 15 may be applied in a random or non-random pattern on shielding label 2. For example, removable adhesive layer 15 may comprise a series of adhesive dots, a single or series of continuous lines, and the like.

Prior to being applied to RFID article 10, removable adhesive layer 15 of shielding label 2 may be adhered to a release liner (not shown). In some embodiments, multiple shielding labels 2 may be attached to a strip or sheet of release liner. In at least one embodiment, the release liner may be in roll-to-roll form so as to provide a series of shielding labels 2 that can be applied by an automated process to a series of RFID articles 10. For example, this could be done in a credit card preparation process. Often, a large number of credit cards are prepared, packaged, and mailed to customers in an automated, continuous process. The shielding labels of the present invention could be applied to the individual credit cards by adding a step to the process prior to the cards being packaged, e.g., placed in an envelope. The shielding labels can protect the cards against information theft while they are in transit to the customer. Once received by the customer, the shielding label can be removed so the card can be used by the customer.

The preferred ranges of material thicknesses will depend on the particular application and use of the shielding label and can be selected to allow a desired balance of material flexibility and shielding.

Figure 2:
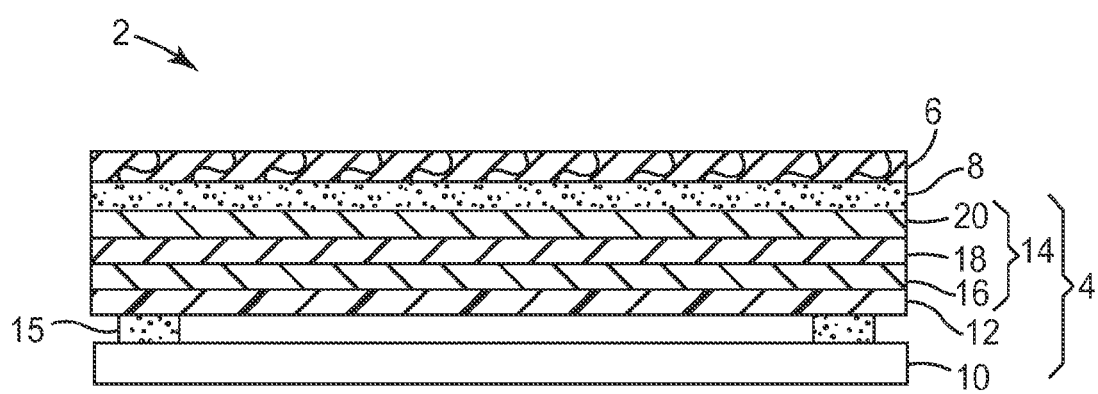
FIG. 2 is a schematic cross-sectional view of at least one embodiment of a shielding label of the present invention attached to an RFID article.

FIG. 2 illustrates an exemplary embodiment of a shielding label according to another embodiment of the present invention. In the embodiment of shielding label 2 illustrated in FIG. 2, conductive layer 14 comprises a layer of copper 18 between a first layer of nickel 16 (also referred to as "priming") and a second layer of nickel 20 (also referred to as "covercoat"). First nickel layer 16, copper layer 18, and second nickel layer 20 are deposited on the surface of support layer 12 using any suitable method known in the art. Nickel layers 16, 20 on either side of copper layer 18 can provide better adhesion to support layer 12 than copper alone and also serve as corrosion protection layers for copper layer 18. Copper layer 18 provides excellent electrical conductivity to allow the construction to act as a shielding label for RFID article 10. In one embodiment, first nickel layer 16 has a thickness in the range of 100 to 400 Angstroms (10 to 40 nm), copper layer 18 has a thickness in the range of 1000 to 3000 Angstroms (100 to 300 nm), and second nickel layer 20 has a thickness in the range of 150 to 600 Angstroms (15 to 60 nm). In at least one embodiment, first nickel layer 16 has a thickness in the range of 100 to 200 Angstroms (10 to 20 nm), copper layer 18 has a thickness in the range of 1600 to 1800 Angstroms (160 to 180 nm), and second nickel layer 20 has a thickness in the range of 200 to 400 Angstroms (20 to 40 nm). Layers of nickel 16, 20 are defined herein as layers including at least one of nickel (Ni), nickel alloys, and austenitic nickel-based superalloys, such as, e.g., the austenitic nickel-based superalloy available under the trade designation INCONEL from Special Metals Corporation, New Hartford, N.Y., U.S.A. Layer of copper 18 is defined herein as a layer including at least one of copper (Cu) and copper alloys.

In the embodiment of FIG. 2, removable adhesive layer 15 forms a continuous strip adjacent the perimeter of shielding label 2.

Cover layer 6 is typically visible when shielding article 2 is adhered to an RFID article 10. As such, it may be desirable to have cover layer 6 display printing or other graphical images and/or to be a particular color. Accordingly, in at least some embodiments of the present invention, cover layer 6 comprises printable material, e.g., material that will receive ink or laser images. In most embodiments, the shielding label is easily printable using offset printing, screen printing, laser printing, inkjet printing, or other suitable printing methods. In at least one embodiment, cover layer 6 may comprise a material that is formed to contain images, such as a film with embedded images, such as a multi-layer reflective film. Suitable materials for use in cover layer 6 include various types of paper, including but not limited to cellulosic paper, nonwoven materials, polymeric materials, multi-layer films etc. In most embodiments of the present invention cover layer 6 is the surface layer that faces away from RFID article and can be decorative or used to transmit information, such as marketing information (e.g., logos, product names, trademarks), or instructional information (e.g., how to activate the card to which it is attached). However, in some embodiments of the present invention, cover layer 6 may be attached to RFID article by removable adhesive layer 15 and support layer 12 or an additional layer on the outer side of support layer 12 may be the surface layer.

In at least one embodiment of the present invention, cover layer 6 comprises a polyester paper coated with an inorganic coating, such as, e.g., the polyester paper coated with an inorganic coating available under the trade designation TufQUIN from 3M Company, St. Paul, Minn., U.S.A. TufQUIN offers the high-temperature capabilities of inorganic materials combined with the high mechanical strength gained by the use of organic fiber. TufQUIN papers can be combined with polyester film to form a flexible laminate uniquely suited for high temperature electrical insulation applications. In another embodiment, cover layer 6 may comprise an aramid paper, such as, e.g., the aramid paper available under the trade designation NOMEX from E. I. du Pont de Nemours and Company, Wilmington, Del., U.S.A. In another embodiment, cover layer 6 comprises a nonwoven material, such as, e.g., the high-density polyethelene nonwoven material available under the trade designation TYVEK from E. I. du Pont de Nemours and Company, Wilmington, Del., U.S.A. In another embodiment, cover layer 6 comprises a cellulosic paper. Depending on the material used, cover layer 6 may be capable of offering chemical protection (such as, e.g., protection against corrosion) as well as physical protection (such as, e.g., protection against abrasion).

In at least one embodiment, optional adhesive layer 8 is used to bond cover layer 6 to shield layer 4. Adhesive layer 8 may include a pressure sensitive adhesive (PSA), a heat activated adhesive (HAA), a hot melt adhesive, an acrylic adhesive, a nonconductive adhesive, a conductive adhesive, or any other suitable adhesive. Adhesive layer 8 may include a corrosion inhibitor. In one embodiment, adhesive layer 8 has a thickness in the range of 0.01 mm to 0.04 mm.

The shielding label described herein has numerous advantages for its intended use. Some of those advantages are described in greater detail below.

One particularly useful advantage of shielding label 2 is its ability to prevent theft of otherwise unauthorized acquisition of data or information. Shielding label 2 can advantageously prevent data or information from being stolen or otherwise detected by unauthorized users. For example, when an unauthorized user utilizes external electromagnetic or electronics equipment to acquire data or information from RFID article 10, shielding label 2 can frustrate, impede, and obstruct an attempt to acquire or capture such data or information from the RFID article 10 by substantially cutting off any magnetic and/or electromagnetic detecting signal emitted from the equipment, and/or by reflecting back the detecting signals emitted from the equipment.

Another useful benefit of a shielding label according to at least one embodiment of the present invention is its thinness, in particular in applications where the shielding label is adhered to an RFID article, such as, e.g., smart card credit cards, identification cards, insurance cards, timecards, payment cards, entry cards, metro cards, passport cards, and the like. Because of its thinness, the shielding label can be applied to RFID article typically without requiring any changes to an envelope or other container in which the credit card, identification card, etc., is held or carried.

Another useful benefit of a shielding label according to at least one embodiment of the present invention is its corrosion resistance, in particular in applications where the shielding label is exposed to moisture and/or heat. In the exemplary embodiment shown in FIG. 2, conductive layer 12 of shielding label includes a layer of copper 18. Copper layer 18 includes at least one of copper (Cu) and copper alloys which are generally prone to corrosion. It is important to protect copper layer 18 against corrosion, because corrosion of copper layer 18 may reduce the shielding effectiveness of shielding label 2. The construction of shielding label 2 shown in FIG. 2 has a number of elements that assist in protecting copper layer 18 from corrosion. For example, nickel layers 16, 20 on either side of copper layer 18 serve as corrosion protection layers for copper layer 18. In addition, support layer 12 provides protection against corrosion on one side of copper layer 18, while cover layer 6 and optional adhesive layer 8 provide protection against corrosion on the other side of copper layer 18.

Adhesive layer 8 may include a corrosion inhibitor to further protect conductive layers, such as copper or aluminum, adjacent the adhesive layer against corrosion.

Figure 3:
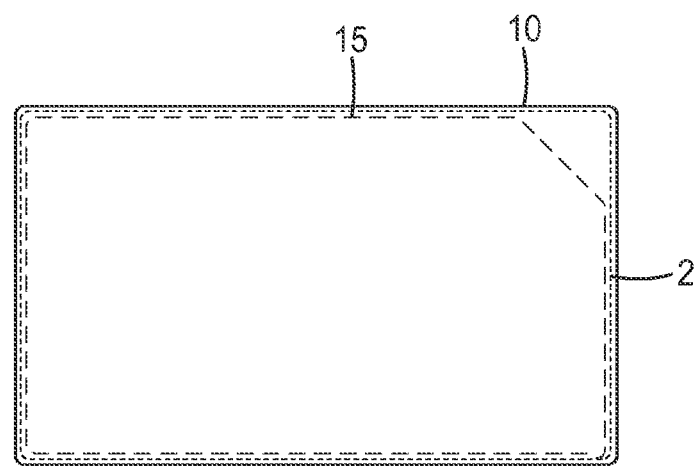
FIG. 3 is a schematic front view of at least one embodiment of a shielding label of the present invention attached to an RFID article.

When RFID article 10 and shielding label 2 are in an assembled configuration, such as in FIG. 3, shield layer 4 provides electromagnetic shielding characteristics so as to prevent exchange of data between RFID article 10 and an external device (not shown). In at least one embodiment shielding label 2 may be shaped and sized corresponding with the size of RFID article 10 and such that one side of RFID article 10 can be easily covered by shielding label 2. For example, shielding label 2 may be shaped and sized to cover one side of a credit card.

Although the shielding label 2 may be made the same size as RFID article 10, shielding label 2 only needs to cover the antenna of RFID article 10 to be effective. Accordingly, shielding label 2 can be any size and shape suitable to cover the antenna of an RFID article. Those skilled in the art will appreciate that shielding labels having various shapes, sizes, and configurations are intended to be encompassed by the invention.

In at least one embodiment of the present invention, the shield article includes a feature that enables easy removal of the shielding label from the RFID article 10. Such feature may include, but is not limited to, a tab that extends slightly or significantly beyond the edge of a portion of RFID article, an outer edge that extends slightly or significantly beyond the edge of one or more sides of the RFID article, or the absence of removable adhesive on a small or large portion of shielding article 2, such as illustrated in FIG. 3. FIG. 3 illustrates an embodiment of a shielding label 2 of the present invention attached to RFID article 10 by removable adhesive layer 15, which covers substantially all of one surface of shielding label 2. One corner of shielding label 2 remains free of removable adhesive layer 15 so that shielding label 2 may be easily grasped at this corner and removed from RFID article 10. In the embodiment of FIG. 3, shielding label 2 is shaped to substantially cover one side of RFID article 10. Shielding label 2 may be shaped using any suitable method or process known in the art such as stamping or cutting.

Embodiments of the present invention also include the shielding label material in sheet or roll form. The shielding label material used to make shielding labels 2 may be manufactured by combining discrete sheets of the individual layers of the shielding labels or the material may be made by applying the various layers is a roll-to-roll process. The shielding label material will comprise a shield layer, typically comprised of a conductive layer and a support layer; a cover layer; and a removable adhesive layer and may further optionally comprise an adhesive layer between the shield layer and cover layer and a release layer adjacent the removable adhesive layer. The shielding label material may be die cut, laser cut, punched, etc. into desired shapes for its intended application(s).

In at least one embodiment, the shielding label material is cut into the desired shapes prior to the application of a release liner. After the release liner is applied, the scrap portions may be removed so the release liner is only carrying the shaped shielding labels, or the scrap portions may be left in place and the shaped shielding labels can be removed as needed.

Providing the shielding label material in roll form allows for the shielding labels to be applied to a card or other item quickly and accurately in an automated process. For example, a roll carrying a series of card may be aligned with a roll carrying the shaped shielding labels. The two rolls may be brought into intimate contact at a point, and in an appropriate configuration, to cause each shielding label to be peel off of its roll and applied to a card on the other roll.

EXAMPLES

Shielding effectiveness measurements on shielding labels according to embodiments of the present invention were conducted using the items described in Table 1.

TABLE 1

| Item | Name/Source | Description |
|---|---|---|
| Reader | SDI010 from SCM Microsystems (now Identive), Germany | Dual interface PC-linked reader that reads/writes to both a 13.56 MHz contactless smart card and almost any contact smart card. Supports ISO 14443A, 14443B, ISO 15693, and ISO 7816 Class A and AB. |
| Diagnostic Tool | SmartPCSCDiag Version (2.04) from SCM Microsystems (now Identive), Germany | Software that provides a visual response to readability of a PIV card. |
| Card 1 | PIV End Point v1.08 FIPS 201 Certified, Oberthur Technologeis, France | RFID card |
| Card 2 | MIFARE DESFire EV1, NXP Semiconductor, Netherlands | RFID card |

Figure 4:
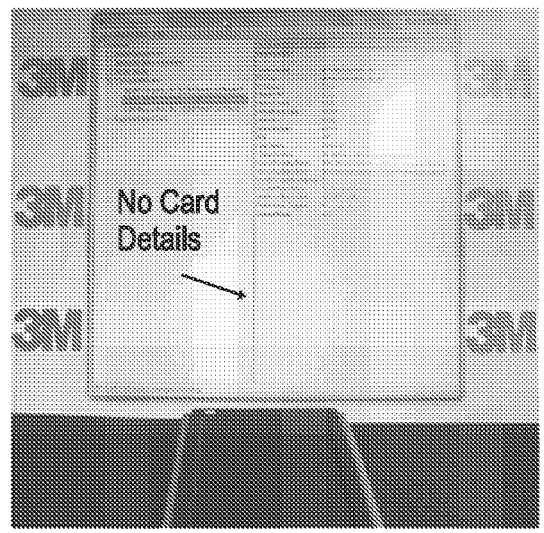
FIG. 4 is a digital image of an RFID card reader.
Figure 5A:
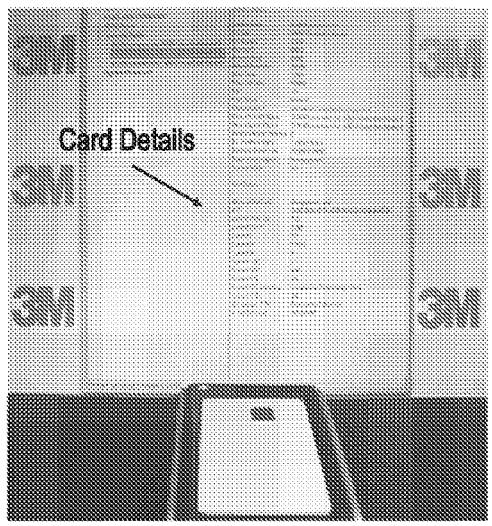
FIGS. 5a and 5b are digital images of RFID cards located on the RFID reader in a first orientation without (5a) and with (5b) the shielding article.
Figure 6A:
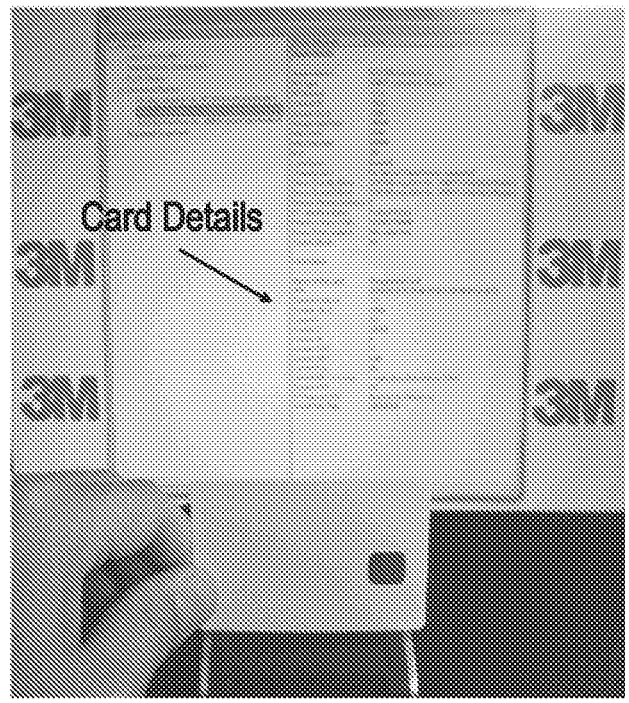
FIGS. 6a and 6b are digital images of RFID cards located on the RFID reader in a second orientation without (6a) and with (6b) the shielding article.
Figure 7A:
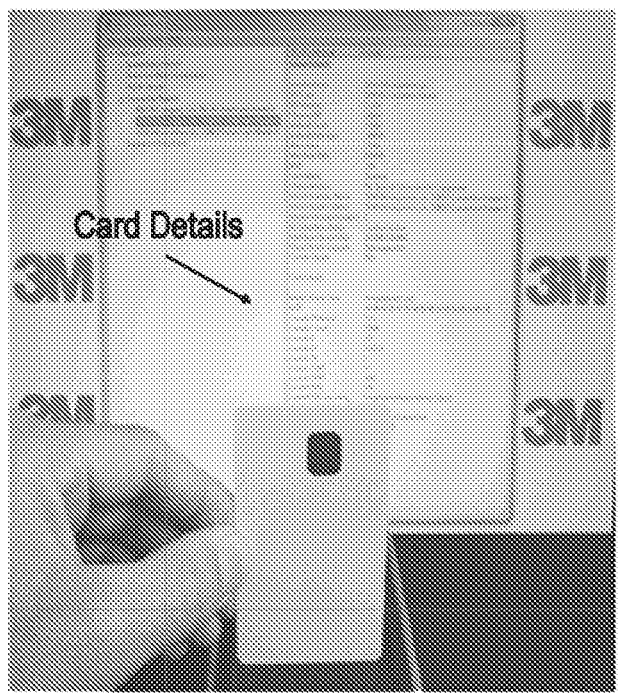
FIGS. 7a and 7b are digital images of RFID cards located on the RFID reader in a third orientation without (7a) and with (7b) the shielding article.

The Reader was used to evaluate the readability of the RFID cards. As illustrated in FIG. 4, when no card is placed on or near the Reader, the diagnostic tools show that no information is obtained upon an interrogation attempt. The RFID cards were first interrogated to ensure their readability. Each of Card 1 and Card 2 were interrogated in different orientations with respect to the Reader. FIG. 5a illustrates an x-axis orientation. FIG. 6a illustrated a y-axis orientation. FIG. 7a illustrates a z-axis orientation. As is illustrated in FIGS. 5a, 6a, 7a and Table 3 below, the Reader was able to interrogate both of the cards in each of the orientations and the diagnostic tool was able to display information obtained from the RFID chips in the cards.

A first set of shielding labels were made with the construction shown in Table 2:

TABLE 2

| | |
|---|---|
| Cover layer | 2.5 mil, 35# coated white lithographic tamper indicating paper (matte) |
| (Optional) Adhesive layer | 0.9 mil acrylic adhesive layer |
| Conductive layer | 0.3 mil, 28 gauge, aluminum foil |
| Support layer | 1.0 mil polyester |
| Releasable adhesive layer | Double-sided acrylic adhesive tape, 3M 9415PC |

Second and third sets of shielding labels were made with the same construction except that the cover layer was (a) 2.5 mil, 35# coated white PET (matte) and (b) 2.5 mil, 35# coated white PET (glossy).

The conductive layer and support layer together comprise the shielding layer. The shielding layer had a shielding effectiveness of about 85 dB at 13.56 MHz and about 74 dB at 0.3 to 1 GHz.

Figure 5B:
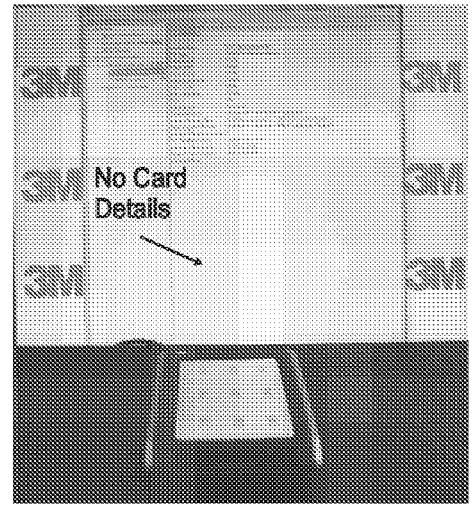
Figure 6B:
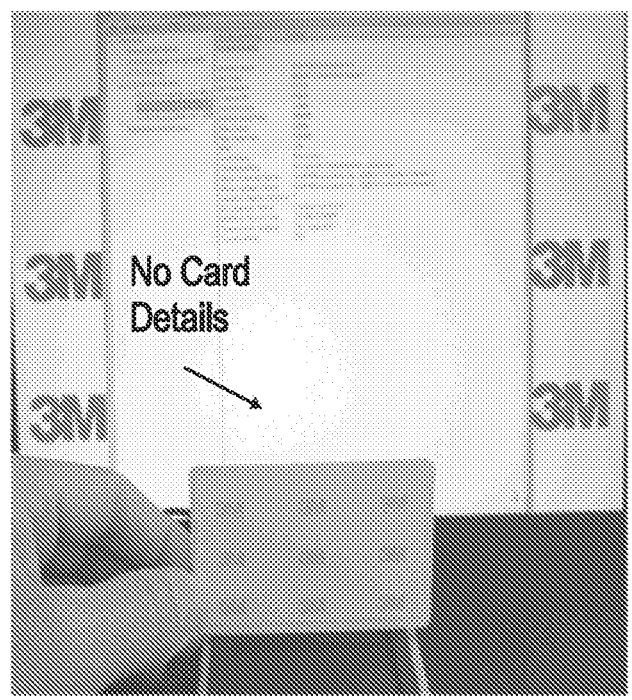
Figure 7B:
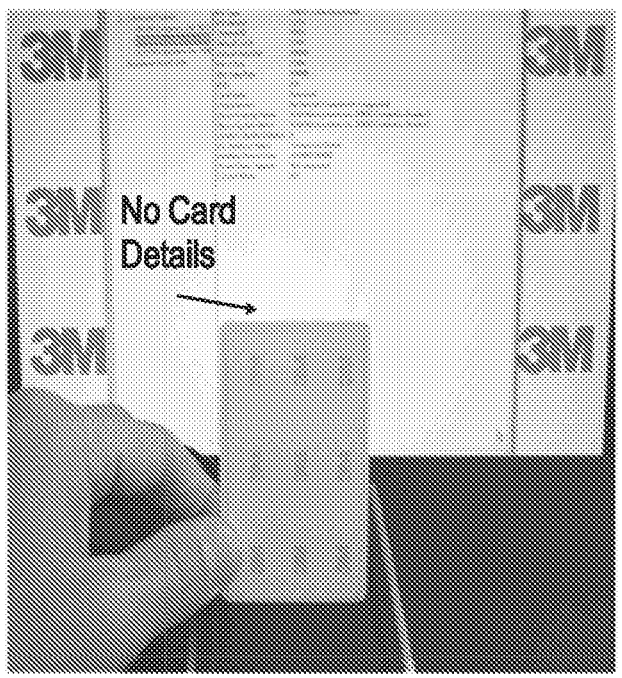

Shielding labels from all three sets were applied to samples of Card1 and Card 2 and were placed on the reader in each of the x-, y-, and z-axis orientations. As is illustrated in FIGS. 5b, 6b, and 7b and in Table 3 below, the Reader was not able to obtain information for the RFID chips in either of the cards in any of the orientations and with any of the cover layers. The diagnostic tool did not display information obtained from the RFID chips in the cards.

TABLE 3

| Orientation to reader | Response of Bare RF Card (read distance (mm)) | | Response of RF Card with Shielding Label | |
|---|---|---|---|---|
| | Card 1 | Card 2 | Card 1 | Card 2 |
| x-axis | Up to 42 | Up to 48 | No read | No read |
| y-axis | Up to 9 | Up to 17 | No read | No read |
| z-axis | Up to 4 | Up to 9 | No read | No read |

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A shielding label comprising:
   a shield layer;
   a cover layer disposed on a first side of the shield layer, and
   a removable adhesive layer disposed on only a portion of a second side of the shield layer such that a portion of the second side of the shield layer remains free of the removable adhesive, wherein the removable adhesive layer comprises a high tack adhesive sub-layer and a low tack adhesive sub-layer,
   wherein the shield layer provides electromagnetic shielding characteristics so as to prevent the exchange of data between an RFID article adjacent the shielding label and an external device when the component is located in the read range of the external device.

2. The shielding label of claim 1, wherein the removable adhesive layer covers more than half of the second side of the shield layer.

3. The shielding label of claim 1, wherein the removable adhesive layer is patterned.

4. The shielding label of claim 1, wherein the removable adhesive layer comprises a repositionable adhesive.

5. The shielding article of claim 1 wherein the removable adhesive layer comprises a double-sided adhesive tape.

6. The shielding label of claim 1, wherein the removable adhesive layer comprises a pressure sensitive adhesive.

7. The shielding label of claim 1, wherein the shield layer comprises a support layer and a conductive layer disposed on the support layer.

8. The shielding label of claim 7, wherein the support layer comprises one of cellulosic paper or a polymer selected from the group consisting of polyester, polypropylene, polycarbonate, and polyethylene.

9. The shielding label of claim 7, wherein the conductive layer comprises a layer of copper.

10. The shielding label of claim 7, wherein the conductive layer comprises a layer of copper between a first layer of nickel and a second layer of nickel.

11. The shielding label of claim 7, wherein the conductive layer comprises a layer of aluminum.

12. A shielding label comprising:
    a shield layer;
    a cover layer disposed on a first side of the shield layer;
    a removable adhesive layer disposed on at least a portion of a second side of the shield layer, wherein the shield layer provides electromagnetic shielding characteristics so as to prevent the exchange of data between an RFID article adjacent the shielding label and an external device when the component is located in the read range of the external device
    an adhesive layer between the shield layer and the cover layer, wherein the adhesive layer comprises at least one of a corrosion inhibitor and a conductive adhesive, wherein the removable adhesive layer comprises a high tack adhesive sub-layer and a low tack adhesive sub-layer.

13. The shielding label of claim 1, wherein the cover layer comprises a film with embedded images.

14. A shielding label comprising:
    a shield layer;
    a cover layer disposed on a first side of the shield layer, and
    an adhesive disposed on only a portion of a second side of the shield layer such that a portion of the second side of the shield layer remains free of the adhesive, wherein the removable adhesive layer comprises a high tack adhesive sub-layer and a low tack adhesive sub-layer,
    wherein the shielding label is shaped to substantially cover an antenna in an RFID article, and wherein the shield layer provides electromagnetic shielding characteristics so as to prevent the exchange of data between the RFID article adjacent the shielding label and an external device when the RFID article and the shielding label are located in the read range of the external device.

15. The shielding label of claim 14, wherein the RFID article comprises one of a credit card, an identification card, an insurance card, a timecard, a payment card, an entry card, a metro card, and a passport card.

16. A material suitable for use in a shielding label comprising:
    a shield layer;
    a cover layer disposed on a first side of the shield layer, and
    a removable adhesive layer disposed on only a portion of a second side of the shield layer such that a portion of the second side of the shield layer remains free of the removable adhesive, wherein the removable adhesive layer comprises a high tack adhesive sub-layer and a low tack adhesive sub-layer,
    wherein the shield layer provides electromagnetic shielding characteristics so as to prevent the exchange of data between an RFID article adjacent the shielding label and an external device when the component is located in the read range of the external device.

17. The material of claim 16 further comprising shaped shielding labels.

* * * * *

UNITED STATES PATENT AND TRADEMARK OFFICE
CERTIFICATE OF CORRECTION

PATENT NO.       : 9,595,211 B2                                           Page 1 of 1
APPLICATION NO.  : 14/414811
DATED            : March 14, 2017
INVENTOR(S)      : Jeffrey Lim It is certified that error appears in the above-identified patent and that said Letters Patent is hereby corrected as shown below:

On the Title Page

Column 2, Abstract
Line 5, Delete "electro-magnetic" and insert -- electromagnetic --, therefor.

In the Specification

Column 3
Line 63, Delete "thermoplasticor" and insert -- thermoplastic or --, therefor.

Column 5
Line 37, Delete "polyethelene" and insert -- polyethylene --, therefor.

Column 7 (Table 1)
Line 11 (Approx.), Delete "Technologeis," and insert -- Technologies, --, therefor.

Column 9
Line 40, Delete "shielding article," and insert -- shielding label, --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*